(12) United States Patent
Lebelo

(10) Patent No.: US 6,237,440 B1
(45) Date of Patent: May 29, 2001

(54) LOCKING DEVICE FOR FAUCET

(76) Inventor: Joshua Lebelo, 796 Miller Dr., Dover, DE (US) 19901

( * ) Notice: Subject to any disclaimer, the term of this patent is extended or adjusted under 35 U.S.C. 154(b) by 0 days.

(21) Appl. No.: 09/311,411

(22) Filed: May 13, 1999

(51) Int. Cl.[7] .................................................. G05G 1/10
(52) U.S. Cl. ............................. 74/553; 74/527; 251/292; 16/121; 16/114 R; 137/315
(58) Field of Search ...................... 74/553, 554, 527; 251/292, 95; 16/121, 114 R; 137/315

(56) References Cited

U.S. PATENT DOCUMENTS

| 4,515,037 | * | 5/1985 | Block | 74/553 |
| 4,549,716 | * | 10/1985 | Warren | 74/554 X |
| 4,565,350 | * | 1/1986 | Rozek | 251/292 |
| 4,593,430 | * | 6/1986 | Spangler et al. | 16/121 |
| 4,783,885 | * | 11/1988 | Bory | 16/114 R |
| 4,842,009 | * | 6/1989 | Reback | 137/315 |
| 4,876,766 | * | 10/1989 | Cohen | 16/114 R |
| 4,895,043 | * | 1/1990 | Lee | 74/527 |
| 5,363,720 | * | 11/1994 | Sanchez | 74/553 |
| 5,741,003 | * | 4/1998 | Segien | 251/95 |

* cited by examiner

Primary Examiner—Vinh T. Luong

(57) ABSTRACT

A locking device for faucet for preventing turning of the knobs of a faucet. The locking device for faucet includes a base plate nonrotatably coupled to a faucet. A locking plate is coupled to the base plate and selectively engages a knob of the faucet for preventing rotation of the knob. A means for releasing disengages the locking plate from the knob.

5 Claims, 2 Drawing Sheets

LOCKING DEVICE FOR FAUCET

BACKGROUND OF THE INVENTION

1. Field of the Invention

The present invention relates to faucet locking devices and more particularly pertains to a new locking device for faucet for preventing turning of the knobs of a faucet.

2. Description of the Prior Art

The use of faucet locking devices is known in the prior art. More specifically, faucet locking devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,549,716; U.S. Pat. No. 4,783,885; U.S. Pat. No. 3,940,196; U.S. Pat. No. Des. 317,497; U.S. Pat. No. 4,561,273; and U.S. Pat. No. 4,899,564.

While these devices fulfill their respective, particular objectives and requirements, the aforementioned patents do not disclose a new locking device for faucet. The inventive device includes a base plate nonrotatably coupled to a faucet. A locking plate is coupled to the base plate and selectively engages a knob of the faucet for preventing rotation of the knob. A release means disengages the locking plate from the knob.

In these respects, the locking device for faucet according to the present invention substantially departs from the conventional concepts and designs of the prior art, and in so doing provides an apparatus primarily developed for the purpose of preventing turning of the knobs of a faucet.

SUMMARY OF THE INVENTION

In view of the foregoing disadvantages inherent in the known types of faucet locking devices now present in the prior art, the present invention provides a new locking device for faucet construction wherein the same can be utilized for preventing turning of the knobs of a faucet.

The general purpose of the present invention, which will be described subsequently in greater detail, is to provide a new locking device for faucet apparatus and method which has many of the advantages of the faucet locking devices mentioned heretofore and many novel features that result in a new locking device for faucet which is not anticipated, rendered obvious, suggested, or even implied by any of the prior art faucet locking devices, either alone or in any combination thereof.

To attain this, the present invention generally comprises a base plate nonrotatably coupled to a faucet. A locking plate is coupled to the base plate and selectively engages a knob of the faucet for preventing rotation of the knob. A release means disengages the locking plate from the knob.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new locking device for faucet apparatus and method which has many of the advantages of the faucet locking devices mentioned heretofore and many novel features that result in a new locking device for faucet which is not anticipated, rendered obvious, suggested, or even implied by any of the prior art faucet locking devices, either alone or in any combination thereof.

It is another object of the present invention to provide a new locking device for faucet which may be easily and efficiently manufactured and marketed.

It is a further object of the present invention to provide a new locking device for faucet which is of a durable and reliable construction.

An even further object of the present invention is to provide a new locking device for faucet which is susceptible of a low cost of manufacture with regard to both materials and labor, and which accordingly is then susceptible of low prices of sale to the consuming public, thereby making such locking device for faucet economically available to the buying public.

Still yet another object of the present invention is to provide a new locking device for faucet which provides in the apparatuses and methods of the prior art some of the advantages thereof, while simultaneously overcoming some of the disadvantages normally associated therewith.

Still another object of the present invention is to provide a new locking device for faucet for preventing turning of the knobs of a faucet.

Yet another object of the present invention is to provide a new locking device for faucet which includes a base plate nonrotatably coupled to a faucet. A locking plate is coupled to the base plate and selectively engages a knob of the faucet for preventing rotation of the knob. A release means disengages the locking plate from the knob.

Still yet another object of the present invention is to provide a new locking device for faucet that prevents children and the elderly from turning on a faucet, possibly burning themselves with hot water.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
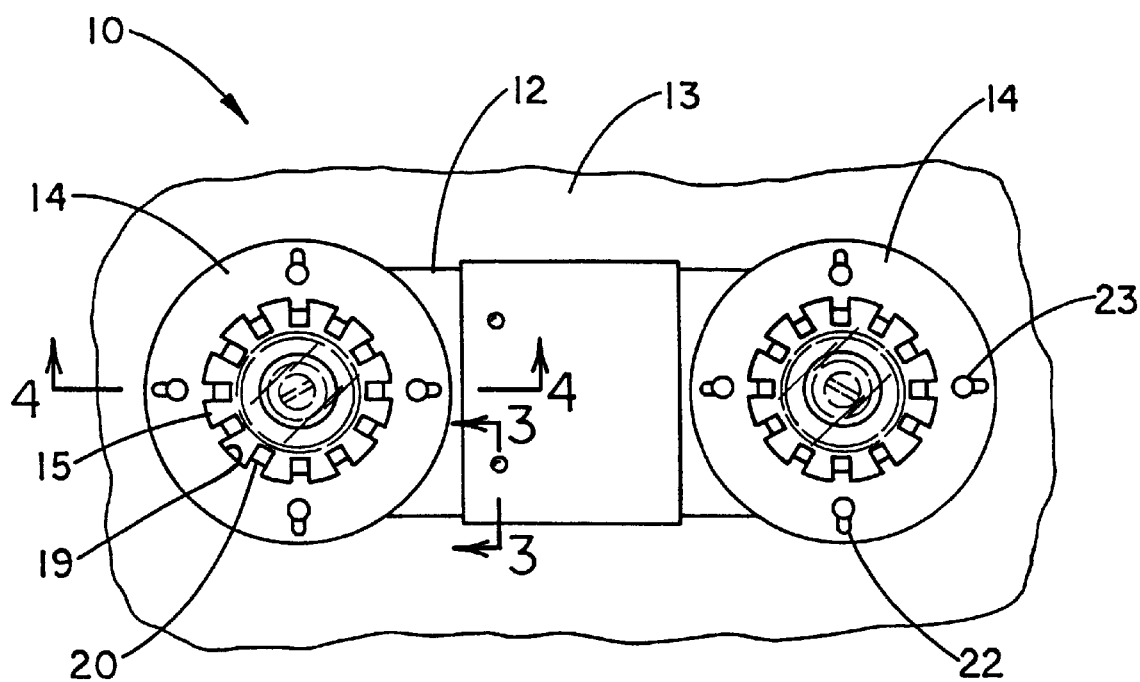
FIG. 1 is a schematic side view of a new locking device for faucet according to the present invention.
Figure 2:
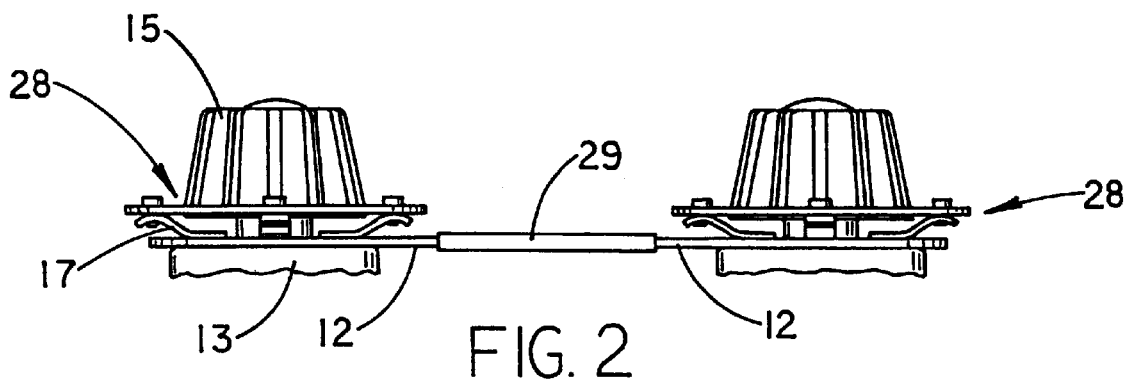
FIG. 2 is a schematic side view of the present invention.

With reference now to the drawings, and in particular to FIGS. 1 through 5 thereof, a new locking device for faucet embodying the principles and concepts of the present invention and generally designated by the reference numeral 10 will be described.

As best illustrated in FIGS. 1 through 5, the locking device for faucet 10 generally comprises a base plate 12 nonrotatably coupled to a faucet 13. A locking plate 14 is coupled to the base plate and selectively engages a knob 15 of the faucet for preventing rotation of the knob. A release means 16 disengages the locking plate from the knob.

Preferably, a plurality of leaf-type springs 17 are coupled to the base plate. Each of the springs has an outer portion 18 that is spaced apart from the base plate.

The locking plate engages the outer portions of the springs. Preferably, the locking plate has a central aperture 19 and one or more teeth 20 extending inwardly from the central aperture. The teeth are designed to be disposed between grasping ridges 21 of a knob of a faucet for engaging the ridges to prevent rotation of the knob.

Ideally, the locking plate has a plurality of slots 22 through it. A plurality of guide pins 23 extend through the slots and are coupled to the outer ends of the springs. The slots allow the guide pins to slide as the spring is compressed. Most ideally, the outer portions of the springs are rounded to reduce wear on the locking plate.

Figure 4:
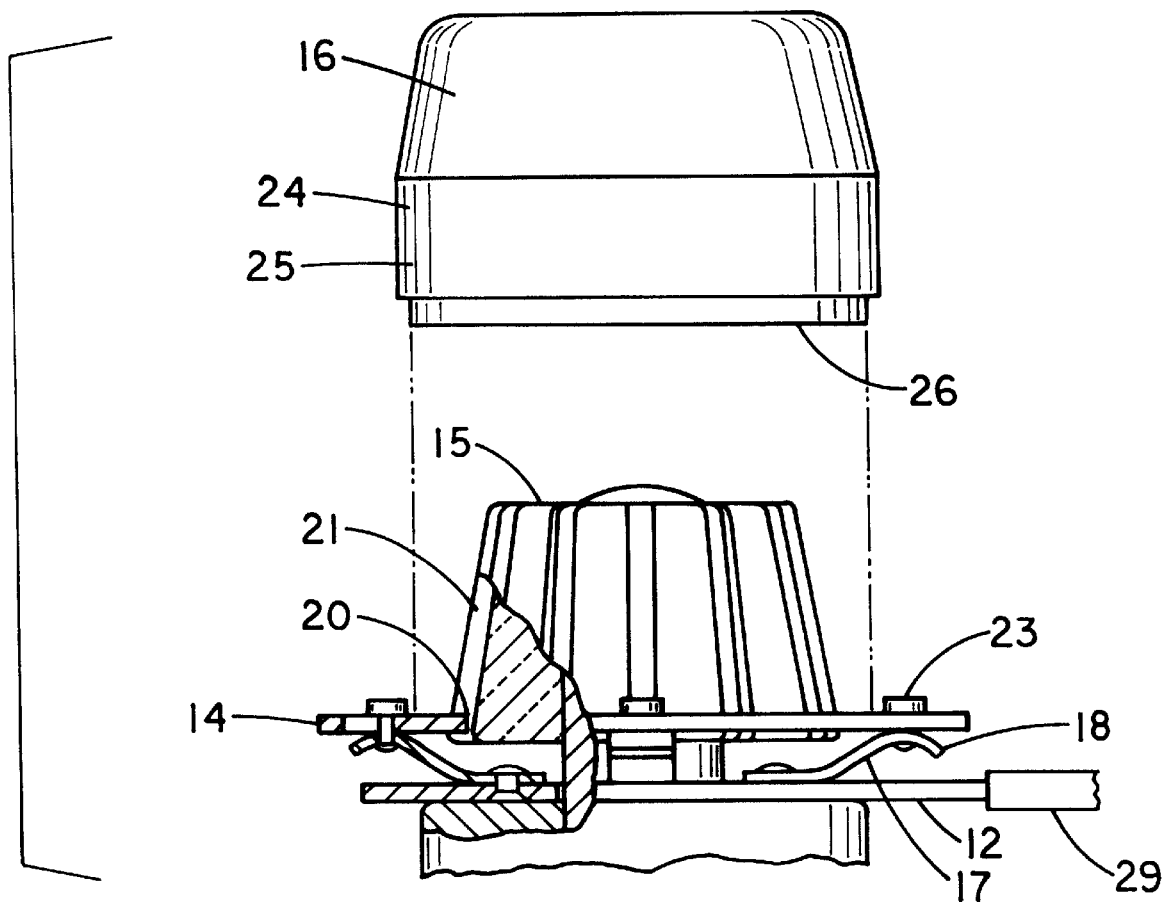
FIG. 4 is a schematic breakaway view of the present invention taken from line 4—4 of FIG. 1.
Figure 5:
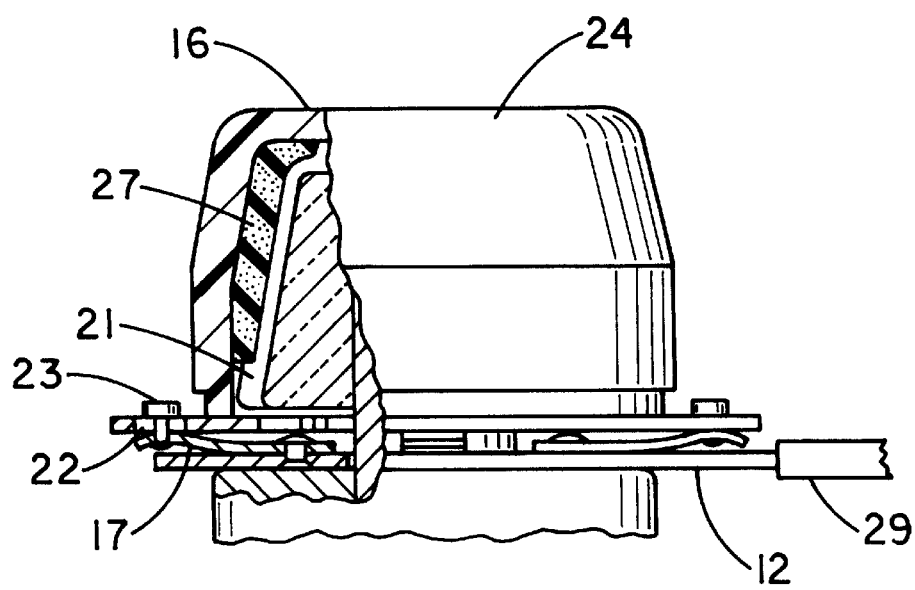
FIG. 5 is a schematic breakaway view of the present invention.

The locking plate is positionable between a locked position, shown in FIG. 4, and an unlocked position, shown in FIG. 5. The teeth are positioned between the grasping ridges of the knob when the locking plate is in the locked position. The teeth are positioned below the grasping ridges of the knob when the locking plate is in the unlocked position. The springs bias the locking plate towards the locked position.

The release means preferably comprises a release housing 24 that is used to position the locking plate in the unlocked position. The release housing has a peripheral sidewall 25 and a lower rim 26 defining an opening into the release housing. The knob is insertable in the release housing. The lower rim engages the locking plate when the knob is inserted in the release housing.

Preferably, the release housing is resiliently deformable and has a resiliently deformable layer 27 extending around an inner surface of the peripheral sidewall for frictionally engaging the knob. The layer may be made of foam rubber, for example.

Ideally, an inner diameter of the layer is about ⅛ inch less than an outer diameter of the knob with both diameters taken along a common plane. This requirement allows the release housing to be frictionally held on the knob by the layer, but the layer does not sufficiently contact the knob to turn it, even if the locking plate is in the unlocked position. Rather, the release housing must be squeezed so that the layer sufficiently engages the knob to turn the knob. Most children and elderly would lack the dexterity to simultaneously push in the locking plate and squeeze the release housing.

Figure 3:
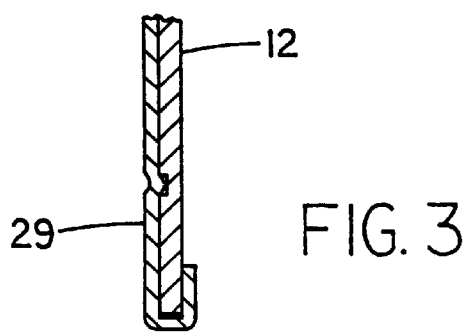
FIG. 3 is a schematic cross sectional view of the present invention taken from line 3—3 of FIG. 1.

In an embodiment for locking both knobs of a faucet, a pair of locking portions 28, each comprising the above described locking device, would telescopically extend from opposite sides of an adjustment sleeve 29. The base plate of each of the locking portions would telescopically extend from the adjustment plate to accommodate faucets with knobs of varying distance from each other. FIG. 3 illustrates how one of the base plates could be locked to the adjustment sleeve while the other slides freely. Each locking portion would be constructed as set forth above for the unitary model.

In use, the release housing is placed over the knob and pressed towards the faucet to position the locking plate in the unlocked position. The sidewall of the release housing is squeezed and turned to turn the knob, thereby letting water flow from the faucet. When sufficient water has flown, the release housing is used in the same manner to turn the knob in the opposite direction to shut the water off.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A locking device for locking a knob of a faucet, comprising:
   a base plate nonrotatably coupled to a faucet;
   a locking plate coupled to said base plate and selectively engaging a knob of said faucet for preventing rotation of said knob;
   a release means for disengaging said locking plate from said knob;
   wherein a plurality of springs are coupled to said base plate, each of said springs having an outer portion being spaced apart from said base plate, said locking plate engaging said outer portions of said springs, said springs biasing said locking plate towards a locked position; and
   said locking plate has a plurality of slots therethrough, a plurality of guide pins extending through said slots and being coupled to said outer ends of said springs.

2. The locking device of claim 1, wherein said locking plate has a central aperture and at least one tooth extending inwardly from the central aperture, said tooth being adapted for being disposed between grasping ridges of a knob of a faucet for engaging said ridges for preventing rotation of said knob, said tooth being positioned between said grasping ridges of said knob when said locking plate is in a locked position, said tooth being positioned below said grasping ridges of said knob when said locking plate is in an unlocked position.

3. A locking device for locking knobs of a faucet, comprising:

an adjustment sleeve; and a pair of locking portions telescopically extending from opposite sides of said adjustment sleeve;

each of said locking portions comprising:

a base plate telescopically extending from said adjustment sleeve;

a plurality of springs coupled to said base plate, each of said springs having an outer portion being spaced apart from said base plate;

a locking plate engaging said outer portions of said springs, said locking plate having a central aperture and a plurality of teeth extending inwardly from the central aperture, said teeth being adapted for being disposed between grasping ridges of a knob of a faucet for engaging said ridges for preventing rotation of said knob;

said locking plate having a plurality of slots therethrough, a plurality of guide pins extending through said slots and being coupled to said outer ends of said springs;

said locking plate being positionable between a locked position and an unlocked position, said teeth being positioned between said grasping ridges of said knob when said locking plate is in said locked position, said teeth being positioned below said grasping ridges of said knob when said locking plate is in said unlocked position, said springs biasing said locking plate towards said locked position;

a release housing for positioning said locking plate in said unlocked position, said release housing having a peripheral sidewall and a lower rim defining an opening into said release housing, said knob being insertable in said release housing, said lower rim engaging said locking plate when said knob is insertable in said release housing;

said release housing being resiliently deformable and having a resiliently deformable layer extending around an inner surface of said peripheral sidewall for frictionally engaging said knob; and wherein an inner diameter of said layer is about 1/8 inch less than an outer diameter of said knob.

4. A locking device for locking a knob of a faucet, comprising:

a base plate nonrotatably coupled to a faucet;

a locking plate coupled to said base plate and selectively engaging a knob of said faucet for preventing rotation of said knob;

a release means for disengaging said locking plate from said knob;

wherein said release means comprises a release housing having a peripheral sidewall and a lower rim defining an opening into said release housing, said knob being insertable in said release housing, said lower rim engaging said locking plate when said knob is insertable in said release housing; and wherein said release housing is resiliently deformable and having a resiliently deformable layer extending around an inner surface of said peripheral sidewall for frictionally engaging said knob.

5. The locking device of claim 4, wherein an inner diameter of said layer is about 1/8 inch less than an outer diameter of said knob.

\* \* \* \* \*